United States Patent [19]
Pengov et al.

[11] Patent Number: 5,969,454
[45] Date of Patent: Oct. 19, 1999

[54] SWITCHED RELUCTANCE MOTOR

[75] Inventors: Wayne A. Pengov, Chardon; Mark Kusner, Gates Mills, both of Ohio

[73] Assignee: Tridelta Industries, Inc., Mentor, Ohio

[21] Appl. No.: 09/170,568

[22] Filed: Oct. 13, 1998

Related U.S. Application Data

[63] Continuation-in-part of application No. 08/545,085, Oct. 19, 1995, Pat. No. 5,852,334.

[51] Int. Cl.$^6$ .................................................. H02K 19/00
[52] U.S. Cl. ........................ 310/162; 310/168; 310/261
[58] Field of Search ................................. 310/168, 261, 310/190, 269, 114, 185, 162

[56] References Cited

U.S. PATENT DOCUMENTS

| | | | |
|---|---|---|---|
| 1,234,914 | 7/1917 | Latour | 310/168 |
| 1,250,752 | 12/1917 | Alexanderson | 310/111 |
| 1,597,453 | 8/1926 | Merrill | 310/111 |
| 1,799,156 | 4/1931 | Dornig | 310/111 |
| 2,732,509 | 1/1956 | Hammerstrom et al. | 310/168 |
| 3,098,164 | 7/1963 | Inoue | 310/111 |
| 3,389,281 | 6/1968 | Ellis | 310/168 |
| 3,401,284 | 9/1968 | French | 310/168 |
| 3,401,285 | 9/1968 | French | 310/168 |
| 3,732,561 | 5/1973 | McGinnis | 340/815.69 |
| 3,995,203 | 11/1976 | Torok | 318/701 |
| 4,491,790 | 1/1985 | Miller | 324/142 |
| 4,575,652 | 3/1986 | Gogue | 310/49 R |
| 4,583,015 | 4/1986 | Toshimitsu | 310/187 |
| 4,626,719 | 12/1986 | Foster | 310/49 R |
| 4,748,362 | 5/1988 | Hedlund | 310/168 |
| 4,766,359 | 8/1988 | Smith et al. | 318/652 |

(List continued on next page.)

FOREIGN PATENT DOCUMENTS

| | | | |
|---|---|---|---|
| 0 695020 A2 | of 0000 | European Pat. Off. | 310/111 |
| 733158 | of 0000 | United Kingdom | 310/111 |

| | | | |
|---|---|---|---|
| WO 97/15108 | 4/1997 | WIPO | |

OTHER PUBLICATIONS

T.J.E. Miller; Switched Reluctance Motors and Their Control, 1993, pp. 2–3, 8–9, 14–15, 26–47, New York.

*Primary Examiner*—Clayton LaBalle
*Assistant Examiner*—Joseph Waks
*Attorney, Agent, or Firm*—Mark Kusner

[57] ABSTRACT

A switched reluctance motor, comprising:

a stator formed from a magnetically permeable material, having "n" number of evenly spaced, radially oriented, like stator poles, the stator poles having like stator pole faces and forming a uniform gap between adjacent stator poles;

windings for two phases wound about stator poles that are circumferentially separated by a winding and an associated stator pole of a different phase;

a rotor mounted for rotation relative to the stator about an axis, the rotor having at least two rotor sections, a first of the at least two rotor sections including at least ¼ "n" number of like, wide rotor poles, each having a like, wide rotor pole face, and a second of the at least two rotor sections including at least ¼ "n" number of like, narrow rotor poles, each having a like, narrow rotor pole face, the rotor having:

a first angular position wherein a first portion of the wide rotor pole faces of the first rotor section are in alignment with a first pair of opposite, energized stator poles and the narrow rotor pole faces of the second rotor section are in alignment with gaps adjacent the first pair of energized stator poles, and a second angular position wherein a second portion of the wide rotor pole faces of the first rotor section are in alignment with the first pair of opposite energized stator poles and the narrow rotor pole faces of the second rotor section are in alignment with the first pair of energized stator poles.

38 Claims, 5 Drawing Sheets

U.S. PATENT DOCUMENTS

| | | | |
|---|---|---|---|
| 4,883,999 | 11/1989 | Hendershot | 310/254 |
| 4,916,346 | 4/1990 | Kliman | 310/216 |
| 4,918,831 | 4/1990 | Kliman | 29/598 |
| 4,995,159 | 2/1991 | Hancock et al. | 29/596 |
| 4,998,052 | 3/1991 | Erdman et al. | 318/701 |
| 5,023,502 | 6/1991 | Johnson | 310/261 |
| 5,075,610 | 12/1991 | Harris | 318/701 |
| 5,111,095 | 5/1992 | Hendershot | 310/168 |
| 5,111,096 | 5/1992 | Horst | 310/168 |
| 5,122,697 | 6/1992 | Horst | 310/181 |
| 5,294,856 | 3/1994 | Horst | 310/181 |
| 5,365,137 | 11/1994 | Richardson et al. | 310/258 |
| 5,517,102 | 5/1996 | Jensen | 318/701 |
| 5,545,938 | 8/1996 | Mecrow | 310/156 |
| 5,604,388 | 2/1997 | Baker et al. | 310/51 |
| 5,652,493 | 7/1997 | Hendershot, Jr. | 318/701 |
| 5,701,065 | 12/1997 | Ishizaki | 318/701 |
| 5,703,421 | 12/1997 | Durkin | 310/61 |
| 5,719,453 | 2/1998 | Horst | 310/68 R |
| 5,719,456 | 2/1998 | Kolomeitsev | 310/112 |
| 5,726,516 | 3/1998 | Randall | 310/261 |
| 5,747,962 | 5/1998 | Fulton | 318/701 |
| 5,844,343 | 12/1998 | Horst | 310/184 |

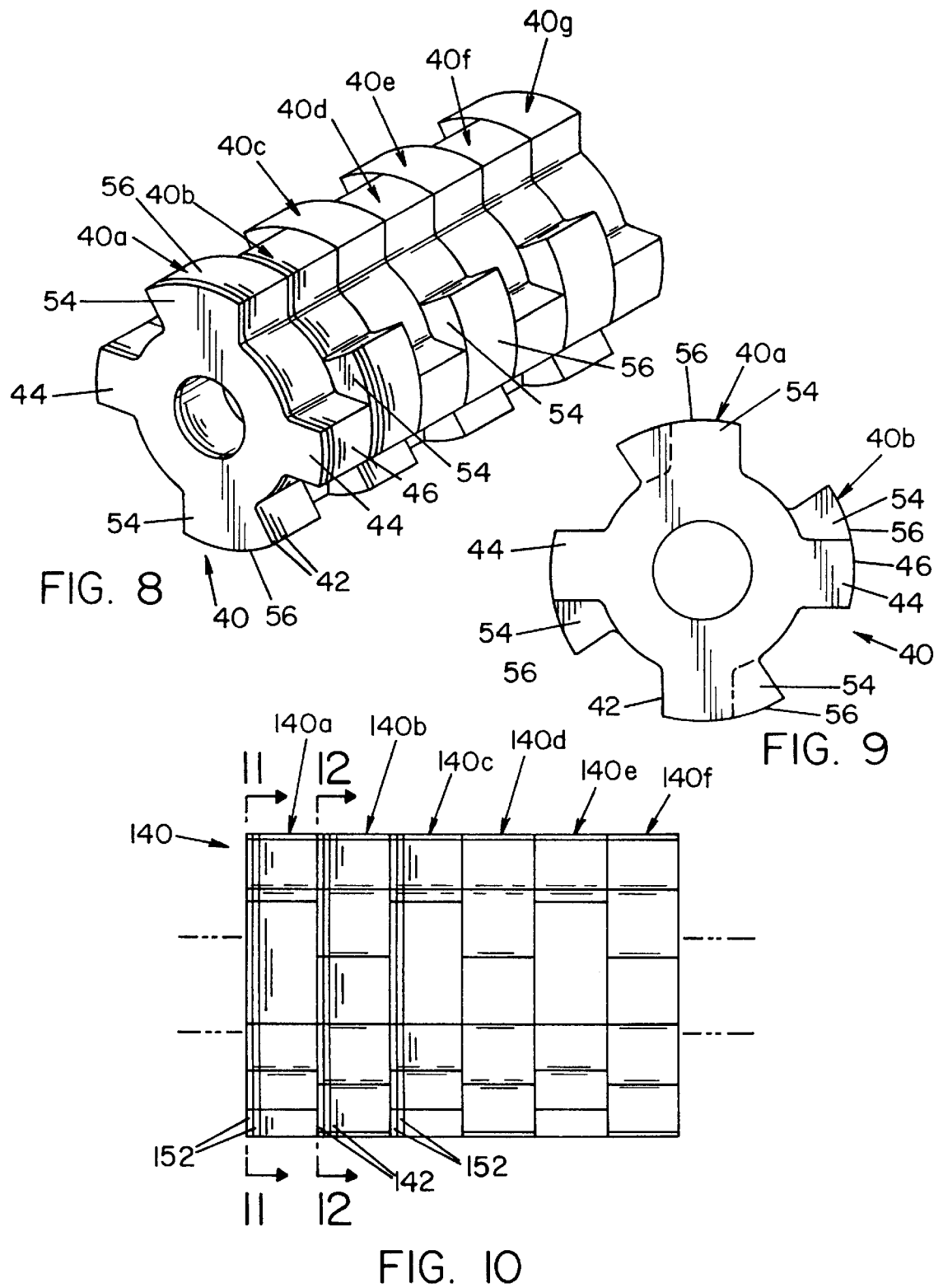

SWITCHED RELUCTANCE MOTOR

This application is a continuation-in-part of application Ser. No. 08/545,085 filed on Oct. 19, 1995 now U.S. Pat. No. 5,852,334.

FIELD OF THE INVENTION

The present invention relates generally to switched reluctance motors, and more particularly to a two-phase switched reluctance motor having a low noise operating characteristic.

BACKGROUND OF THE INVENTION

Noise has always been an undesirable characteristic of switched reluctance motors in that such motors tend to produce a noticeable whine or hum during operation. The noise is believed to be generated by vibration of the stator as it is deformed during each phase energization and deenergization. The stator of a switched reluctance motors is typically comprised of a ring having a plurality of inwardly extending stator poles. During each phase energization, opposing stator poles are electrically energized to form a magnetic field that draws the nearest rotor poles into alignment therewith. The magnetic field that draws the rotor into alignment with the stators may also deform the stator by drawing the opposing energized stator poles towards the rotor. These attractive forces tend to distort the stator ring from its generally circular configuration. Stated another way, the opposing attractive forces tend to "ovalize" the stator as opposing, energized poles are drawn toward each other. Upon de-energization of the stator poles, the stator "springs" or "snaps" back to its original circular configuration. It will of course be appreciated that distortion of the stator pole is extremely slight. Nevertheless, the distortion produced during each phase energization and de-energization causes the entire motor to "vibrate" or "hum" during continuous operation thereby, producing the undesirable acoustical noise.

U.S. patent application Ser. No. 08/545,085 to Pengov discloses a two-phase switched reluctance motor that, among other things, addresses the noise problems of two-phase motors. The disclosed motor has a rotor with wide rotor poles and narrow rotor poles. During each phase energization, the rotor is sequentially advanced in a two-step fashion. In the 8/4 switched reluctance motor shown in the '085 application, during the first step, the leading edges of the wide rotor poles interact with a first pair of opposed energized stator poles. During the second step, narrow rotor poles are drawn into alignment with a second set of opposed stator poles. Importantly, because of the width of the wide rotor poles, the attractive forces exerted on this second set of opposed stator poles takes place while attractive forces are still exerted on the first set of opposed stator poles. Thus, during each phase energization, the stator first experiences opposed inward forces, 180° apart, drawing the stator out of round, then during the second phase experience, a second set of forces, 180° apart but 90° to the first forces, drawing the sides of the stator inwardly. The original radial forces thus are offset by the second set of radial forces that are 90° therefrom. As a result, during the second step or portion of each phase energization, the stator is generally stiffened by inward radial forces 90° apart created by two sets of opposed stator poles. Upon deenergization of a phase, rather than switching from an oval configuration to a round configuration, the generally balanced stator relaxes more uniformly. The motor shown in U.S. patent application Ser. No. 08/545,085 thus, in addition to the other operating characteristics resulting from the unique rotor design, provides a less noisy two-phase switched reluctance motor.

The present invention provides an improvement to the motor disclosed in U.S. patent application Ser. No. 08/545,085 and provides a switched reluctance motor that axially distributes the internal attractive forces created between the stator and the rotor to reduce acoustical noise.

SUMMARY OF THE INVENTION

In accordance with the present invention, there is provided a switched reluctance motor comprising a stator having an even number "n" of magnetically permeable stator poles evenly spaced circumferentially about a central axis. Each of the stator poles faces the axis and traverses a first stator angle. A rotor is mounted for rotation relative to the stator about the axis. The rotor is comprised of at least two rotor sections. Each of the two rotor sections has an even number of magnetically permeable rotor poles spaced about the axis, the number of rotor poles being ½ "n." Each of the rotor sections includes at least one narrow pole having a narrow face that traverses a first rotor angle, the first rotor angle being approximately equal to the first stator angle and at least one wide pole having a wide face that traverses a second rotor angle approximately twice the first rotor angle. The rotor poles are distributed on the rotor sections wherein a narrow pole follows a wide pole along a circumferential path in a direction of rotation of the rotor section and the narrow pole face is spaced from a wide pole face on one side by a first angle equal to about twice (2) the first stator angle and on another side by a second angle equal to about three (3) times the first stator angle. The at least two rotor sections are angularly offset from each other about the axis by an angle of about four (4) times the first stator angle.

In accordance with another aspect of the present invention, there is provided a switched reluctance motor driven by a two-phase source comprised of a stator having a plurality of evenly spaced, angularly-oriented like poles distributed thereon. The stator poles define a gap between adjacent stator poles. Windings are provided for each of the two phases of the motor and are wound about stator poles that are circumferentially separated by a winding and an associated stator pole of a different phase. A rotor is mounted for rotation about an axis relative to the stator. The rotor has at least two adjacent rotor sections of like cross-section. Each of the rotor sections has a wide rotor pole and a narrow rotor pole distributed on the rotor sections wherein a narrow rotor pole is disposed to each side of a wide rotor pole in a direction of circumferential rotation. The rotor sections are angularly offset relative to each other about the axis such that the energization of one of the two phases causes the wide rotor pole on one of the at least two rotor sections to interact with a first energized stator pole while the wide rotor pole on another of the at least two rotor sections interact with a second energized stator poles to induce a first torque on said rotor and to produce a first predetermined angular rotation of the rotor. Thereafter, the narrow pole on the one of the at least two rotor sections interacts with the second stator pole while the narrow pole on the another of the at least two rotor sections interacts with the first stator pole to induce a second torque on the rotor and to produce a second predetermined angular rotation on the rotor.

In accordance with another aspect of the present invention, there is provided a switched reluctance motor comprised of a stator having eight (8) evenly spaced, radially inwardly extending, like stator poles that define a uniform gap between adjacent stator poles. The stator is formed from a plurality of laminations formed from a magnetically permeable material. The stator has a uniform cross-sectional shape along an axis extending through the stator. Windings are provided for two phases and are wound about stator poles that are circumferentially separated by a winding and an associated stator pole of a different phase. A rotor is supported within the stator for relative rotational movement about the axis. The rotor has at least two rotor sections. The two rotor sections have like cross-sectional shapes along the axis, and each of the rotor sections has two, outwardly extending wide rotor poles disposed about 180° apart and two, outwardly extending narrow rotor poles disposed 180° apart. A narrow rotor pole is disposed between each wide rotor pole in a circumferential direction of rotation. The narrow poles and the wide poles on each of the rotor sections are disposed relative to each other, wherein when the rotor is in a first angular rotor position, all of the wide rotor poles of the rotor sections are in minimum reluctance positions with energized stator poles, and when the rotor is in a second angular rotor position, all of the narrow rotor poles and all of the wide rotor poles are in minimum reluctance positions with energized stator poles. The first rotor section is angularly offset about the axis from the second rotor section by about 90°.

In accordance with another aspect of the present invention, there is provided a switched reluctance motor comprised of a stator formed from magnetically permeable material having "n" number of evenly spaced, radially oriented, like stator poles. The stator poles have like stator pole faces and form a uniform gap between adjacent stator poles. Windings are provided for two phases and are wound about stator poles that are circumferentially separated by a winding and an associated stator pole of a different phase. A rotor is mounted for rotation relative to the stator about an axis. The rotor has at least two rotor sections, a first of the at least two rotor sections including at least ¼ "n" number of like, wide rotor poles, each having a like, wide rotor pole face, and a second of the at least two rotor sections including at least ¼ "n" number of like, narrow rotor poles, each having a like, narrow rotor pole face. The rotor has a first angular position wherein a first portion of the wide rotor pole faces of the first rotor section are in alignment with a first pair of opposite, energized stator poles and the narrow rotor pole faces of the second rotor section are in alignment with gaps adjacent the first pair of energized stator poles, and a second angular position wherein a second portion of the wide rotor pole faces of the first rotor section are in alignment with the first pair of opposite energized stator poles and the narrow rotor pole faces of the second rotor section are in alignment with the first pair of energized stator poles.

In accordance with another aspect of the present invention, there is provided a rotor for use in a switched reluctance motor comprised of a first rotor section having at least one radially outwardly extending narrow pole. The narrow pole has a pole face of a predetermined angle defining a first narrow pole face edge and a second narrow pole face edge in a direction of rotation of the rotor. The rotor further has a second rotor section having at least one radially outwardly extending wide rotor pole. The wide rotor pole has a wide pole face of an angle about twice the angle defining the narrow pole face. The wide pole face defines a first wide pole face edge and a second wide pole face edge in a direction of rotation of the rotor. The second rotor section is disposed adjacent the first rotor section wherein the second wide pole face edge is aligned with the second narrow pole face edge.

It is an object of the present invention to provide a switched reluctance motor exhibiting reduced stator deflection and therefore less acoustical noise during operation.

Another object of the present invention is to provide a switched reluctance motor as described above that more uniformly distributes the internal attractive forces experienced by the stator and rotor during each phase energization.

Another object of the present invention is to provide a switched reluctance motor as described above wherein the switched reluctance motor is a two-phase motor.

A still further object of the present invention is to provide a switched reluctance motor as described above wherein the rotor is comprised of a plurality of stacked laminations formed of a magnetically permeable material.

A still further object of the present invention is to provide a switched reluctance motor as described above wherein each lamination forming the rotor is identical.

A still further object of the present invention is to provide a switched reluctance motor as described above wherein the rotor is comprised of laminations having two distinct lamination configurations.

These and other objects and advantages will become apparent from the following description of preferred embodiments of the present invention taken together with the accompanying drawings.

BRIEF DESCRIPTION OF THE DRAWINGS

The invention may take physical form in certain parts and arrangement of parts, preferred embodiments of which will be described in detail in the specification and illustrated in the accompanying drawings which form a part hereof, and wherein:

FIG. 8 is a perspective view of the rotor in the motor shown in FIG. 1;

FIG. 9 is an end view of the rotor shown in FIG. 8;

FIG. 10 is a side elevational view of a rotor illustrating an alternate embodiment of the present invention;

DETAILED DESCRIPTION OF PREFERRED EMBODIMENTS

Figure 1:
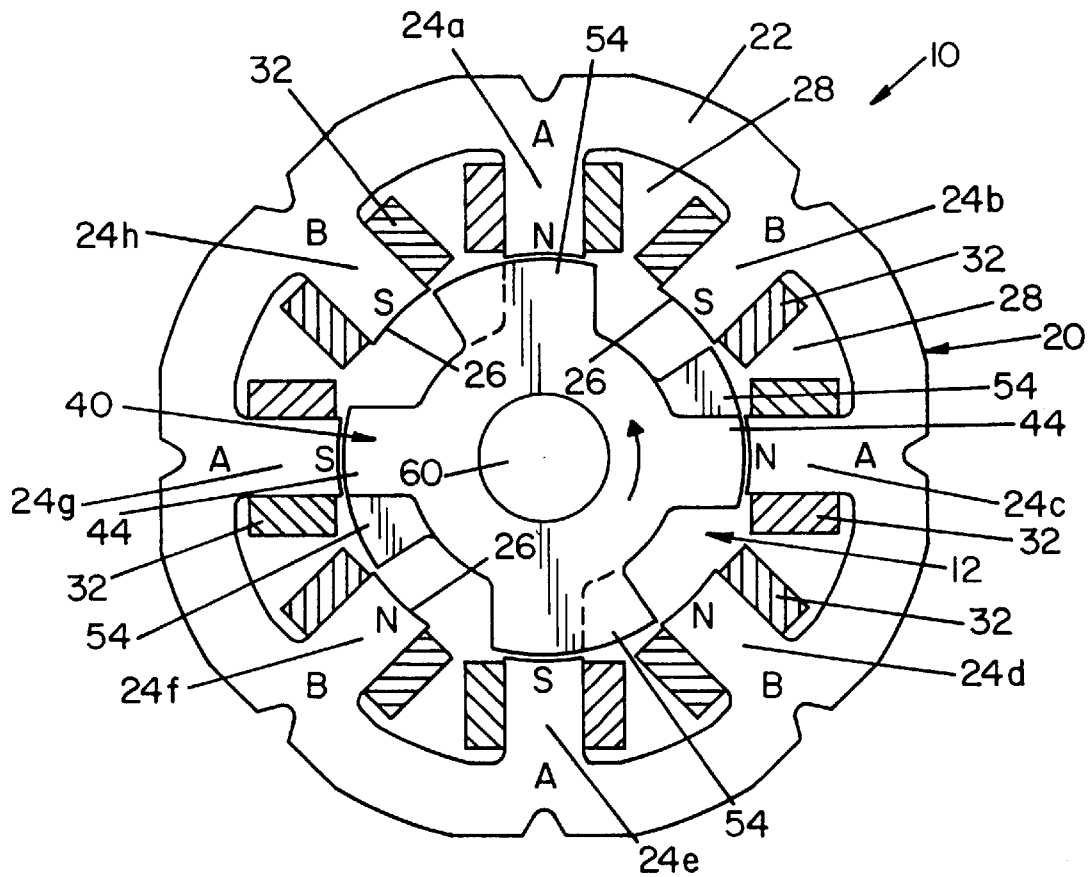
FIG. 1 is a sectional view of an 8/4 switched reluctance motor illustrating a preferred embodiment of the present invention.
Figure 2:
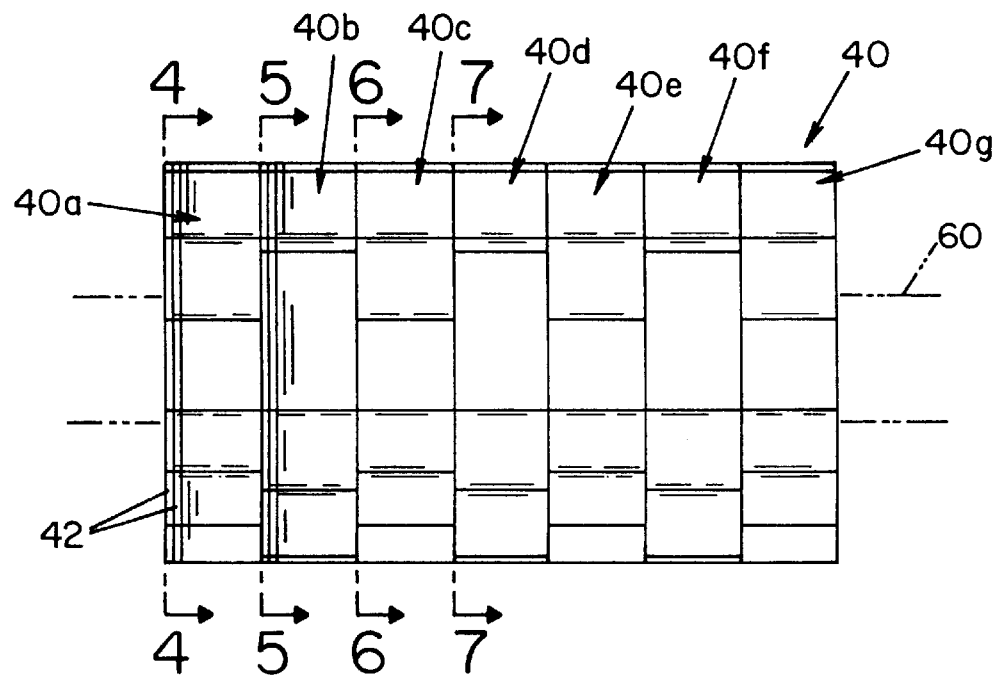
FIG. 2 is a side, elevational view of a rotor used in the motor shown in FIG. 1.

Referring now to the drawings wherein the showings are for the purpose of illustrating preferred embodiments of the invention only, and not for the purpose of limiting same, FIG. 1 shows a cross-sectional view of a two-phase switched reluctance motor 10 illustrating a preferred embodiment of the present invention. In the embodiment shown, an 8 stator pole/4 rotor pole switched reluctance motor is shown. Motor 10, as shown in FIG. 1, is an improvement to the motor shown and disclosed in U.S. patent application Ser. No. 08/545,085 to Pengov, the disclosure of which is expressly incorporated herein by reference. Specifically, the present invention is an improvement of the rotor shown in the 08/545,085 application that more evenly distributes the internal attractive forces exerted on the stator and rotor during each phase energization so to reduce acoustical noise during the operation of the motor.

One embodiment of the invention described in U.S. application Ser. No. 08/545,085 discloses an 8/4 motor, i.e., a motor having a stator with eight stator poles and a rotor with four rotor poles. The rotor includes two wide rotor poles that are diametrically opposite each other and extend along the entire axial length of the rotor. During each phase energization, four of the eight stator poles are energized. Energization of a particular phase causes the rotor to rotate in a two-step manner. The first step or portion of the angular rotation is created by the leading half of the two diametrically opposite wide rotor poles moving into minimum reluctance relationship with a pair of diametrically opposite energized stator poles. When this occurs, the stator is distorted as magnetic forces are exerted between the two interacting sets of rotor and stator poles. In other words, the opposite sides of the stator are drawn inwardly (thereby distorting the stator) as the leading edges of these diametrically opposite wide rotor poles interact with opposing energized stator poles. The second half or portion of the angular rotation of the rotor is created as two narrow rotor poles interact with the remaining two opposite energized stator poles. When this occurs, the stator experiences a second set of inwardly extending radial forces as the narrow rotor poles interact with the second set of energized stator poles. The stator experiences this second set of inwardly radial forces exerted by the narrow rotor poles in addition to the radially inward forces exerted on the original pairs of stator poles by the trailing half of the wide rotor poles. During this second half of the angular rotation of the rotor, a more balanced distribution of the radial forces exists as the stator is drawn toward the rotor at the location of all four energized stator poles. As the phase changes, the stator relaxes as the magnetic attraction exerted by the four energized stator poles is removed and the foregoing two-pole to four-pole force interaction of the rotor occurs again with the second energized phase. It is this imbalance of forces and the continual repetition of this imbalance that causes vibration in the stator. While the acoustical noise associated with the aforementioned motor is noticeably less than other conventional two-phase switched reluctance motors, it is an object of the present invention to reduce even more the acoustical noise of switched reluctance motors.

Figure 3:
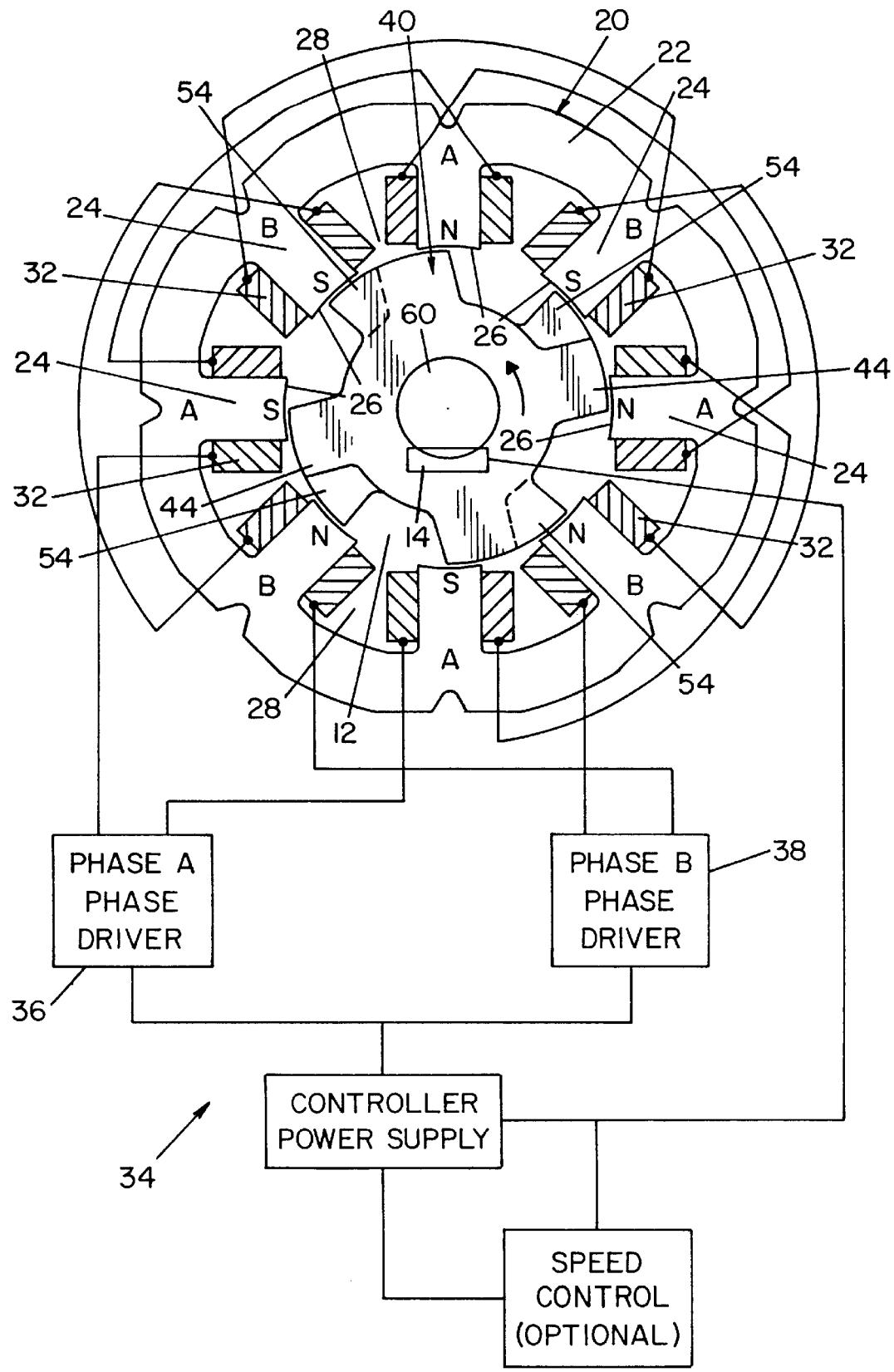
FIG. 3 is a sectional view of the motor shown in FIG. 1, schematically illustrating associated control and operational circuitry connected thereto.

Referring now to the present invention, motor 10 is comprised of a stator 20 and a rotor 40. Stator 20 is comprised of a stack of plate laminations 22 that are formed of a ferromagnetic material. Laminations 22 are stacked face-to-face and suitably adhered to one another by means conventionally known in the art. Stator 20 includes a plurality of like, inwardly extending stator poles 24 having inwardly facing concave stator pole faces 26. In the embodiment shown, stator 20 has eight (8) stator poles, designated 24*a*, 24*b*, 24*c*, 24*d*, 24*e*, 24*f*, 24*g* and 24*h*. A gap 28 is defined between adjacent stator poles 24. Stator pole faces 26 define a central bore 12 for receiving rotor 40. An electrical conductor 32 is wound about each stator pole 24. As schematically illustrated in FIG. 3, conductors 32 are connected to an electrical current pulse generating circuit 34 having a phase A driver 36 and a phase B driver 38. Conductors 32 are connected to phase A driver 36 and phase B driver 38 as shown in FIG. 3 to create stator poles of two phases, A and B. In the embodiment shown in FIGS. 1–13, stator poles 24*a*, 24*c*, 24*e* and 24*g* are connected as A phase stator poles, and stator poles 24*b*, 24*d*, 24*f* and 24*h* are connected as B phase stator poles. As shown in FIG. 3, adjacent stator poles 24 have a different phase, and diametrically opposed stator poles 24 have opposite polarities. The current pulse generating circuit 34 is conventional in the art and is operable to selectively generate pulses of electrical current through conductors 32. The timing of current pulses generated by current pulse generating circuit 34 is determined by a position sensor 14. Position sensor 14 is connected between stator 20 and rotor 40 and provides a signal indicative of the relative position of rotor 40 relative to stator 20.

Referring now to rotor 40, like stator 20, rotor 40 is comprised of a stack of plate laminations that are formed of a ferromagnetic material. In the embodiment shown in FIGS. 1–8, rotor 40 is comprised of like laminations 42. As best seen in FIGS. 4–7, each rotor lamination 42 has diametrically opposed narrow rotor poles 44 having narrow rotor pole faces 46, and diametrically opposed wide rotor poles 54 having wide rotor pole faces 56. Narrow rotor pole face 46 is dimensioned to be slightly larger (preferably less than 2 radial degrees) than a stator pole face 26. Wide rotor pole face 56 is dimensioned to be slightly larger than one stator pole face 26 and a gap 28 adjacent thereto. Narrow rotor poles 44 and wide rotor poles 54 are oriented relative to each other such that each narrow rotor pole face is in alignment (i.e., spans) a stator pole face 26 when each wide rotor pole face 56 spans a stator pole face 26 and an adjacent gap 28, as best illustrated in FIGS. 4–7.

According to one aspect of the present invention, rotor laminations 42 are stacked face-to-face in groups designated 40*a*, 40*b*, 40*c*, 40*d*, 40*e*, 40*f* and 40*g*. As best seen in FIGS. 8 and 9, adjacent groups of rotor laminations are basically offset, i.e., angularly rotated relative to each other. In the embodiment shown, adjacent groups of rotor laminations are offset 90° relative to each other. Adjacent groups of rotor laminations are positioned relative to each other so that the trailing edges (in the preferred direction of rotation) of the groups are aligned, as best seen in FIG. 9. Preferably, each rotor group has a like number of rotor laminations 42 therein. Rotor 40 is fixedly mounted onto a shaft 60 for rotation therewith. Rotor laminations 42 are suitably adhered to one another by conventionally known means to produce a rotor 40, as shown in FIG. 8.

Figure 4:
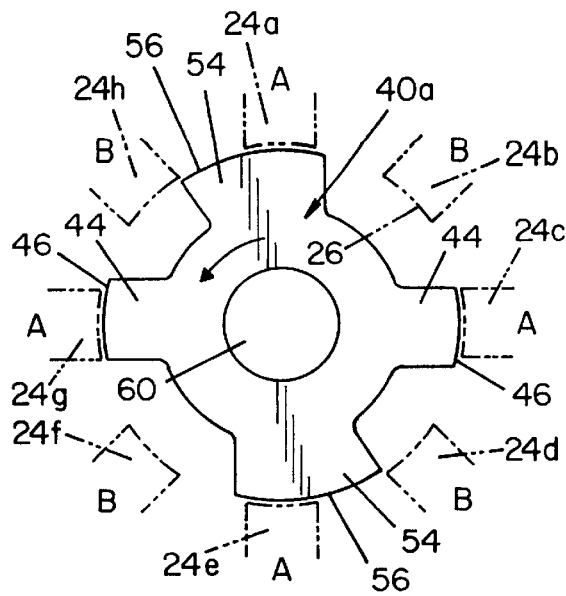
FIG. 4 is a sectional view taken along line 4—4 of FIG. 2.
Figure 5:
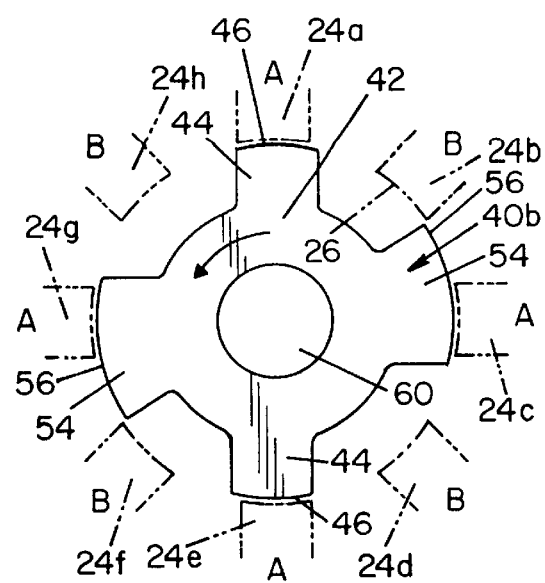
FIG. 5 is a sectional view taken along lines 5—5 of FIG. 2.
Figure 6:
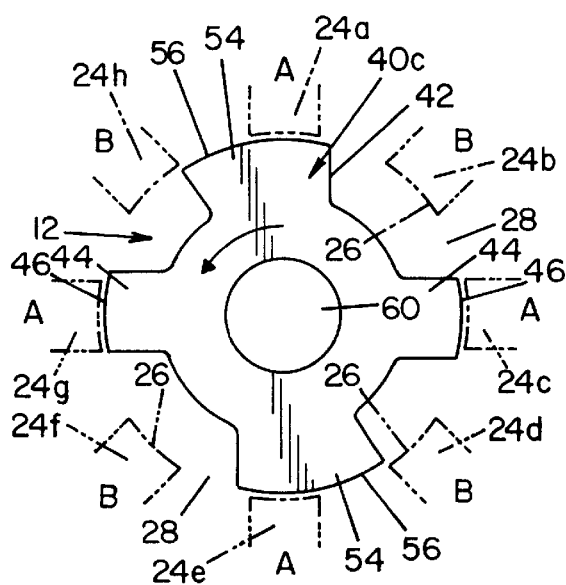
FIG. 6 is a sectional view taken along lines 6—6 of FIG. 2.
Figure 7:
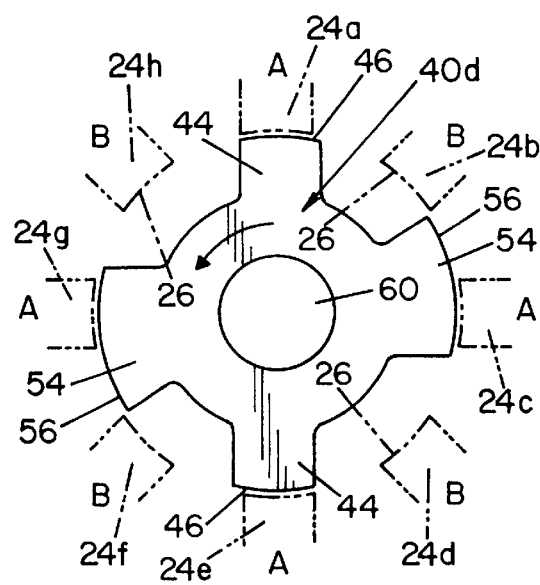
FIG. 7 is a sectional view taken along lines 7—7 of FIG. 2.

FIGS. 4–7 illustrate the relative orientation that rotor groups 40*a*, 40*b*, 40*c* and 40*d* have on shaft 60. FIGS. 4 and 6 show that rotor groups 40*a* and 40*c*, respectively, are oriented in the same position on shaft 60 relative to stator 20. In this respect, both rotor group 40*a* and 40*c* have narrow rotor poles 44 aligned with stator poles 24 and the trailing edge of wide rotor pole 54 in alignment with stator poles 24. Rotor group 40*b*, shown in FIG. 5, is disposed between rotor group 40*a* and 40*c* and is oriented 90° relative thereto, wherein narrow rotor poles 44 of rotor group 40*b* are aligned with stator poles 24 and the trailing half of pole face 56 of wide rotor pole 54 is aligned with stator pole 24.

Referring now to the present invention, by orienting adjacent rotor groups of laminates 90° relative to each other, a more balanced force distribution is provided during each phase energization. During each phase energization of the embodiment shown in FIGS. 1–9, groups of wide rotor poles will interact with each of the energized stator poles. FIGS. 4–6 show the positions of rotor sections 40*a*, 40*b*, 40*c* and 40*d* relative to stator 20, immediately prior to energization of phase B. When phase B is energized, the leading edges of the wide rotor poles 54 of the respective rotor sections will be drawn to positions of minimum reluctance with respect to the energized stator poles 24. Specifically, when phase B is energized, wide rotor poles 54 of rotor section 40*a*, 40*c*, 40*e* and 40*g* will be drawn into minimum reluctance position with energized stator poles 24*d* and 24*h* (i.e., where the leading half of wide rotor pole 54 overlaps and is in alignment with stator poles 24*d* and 24*h*). At the same time, wide rotor poles 54 of rotor sections 40*b*, 40*d* and 40*f* are drawn into minimum reluctance position with energized stator poles 24*b* and 24*f*. The interaction between the wide rotor poles 54 of all the rotor sections and the energized stator poles 24*b*, 24*d*, 24*f* and 24*h* produces the first half of the phase angular rotation. Importantly, the inwardly attractive forces exerted on stator 20 are equally spaced at all four locations of energized stator poles, i.e., at locations 90 angular degrees apart.

Further rotation of rotor 40 is created by narrow poles 44 being drawn into minimum reluctance position with each of the energized stator poles 24. Specifically, narrow rotor poles 44 of rotor sections 40a, 40c, 40e and 40g move into minimum reluctance relationship (i.e., into alignment) with energized stator poles 24b and 24f while narrow rotor poles 44 of rotor sections 40b, 40d and 40f move into minimum reluctance position with energized stator poles 24d and 24h.

During the first portion of the angular rotation of rotor 40 during the energization of phase B, half the total pole face surface areas of the stator pole faces 26 of energized stator poles 24b, 24d, 24f and 24h are covered by rotor pole faces (i.e., the wide rotor pole faces 56). During the second portion of the angular rotation of rotor 40 during phase B energization, the other half of the total pole face surface area of the stator pole faces of the energized stator poles are covered by narrow rotor pole faces 46. Because of the staggered, offset positioning of the rotor sections, during the first portion of the angular rotation of rotor 40, a portion of each of the energized stator poles 24 interacts with a rotor pole (i.e., the wide rotor poles 54). The magnetic attractive forces exerted on stator 20 are thus more uniformly distributed, as contrasted to the motor shown in prior application Ser. No. 08/545,085. That is, in the '085 application, the entire surface of only two of the four energized stator poles is covered by the wide rotor poles during the first half of the angular rotation of the rotor. By staggering the rotor sections, the initial attractive forces caused by a phase energization are exerted in four, equally spaced directions, rather than just two as occurs in the motor in prior application Ser. No. 08/545,085. Thus, stator 20 experiences a more balanced, four-force system from the beginning of the angular rotation throughout the entire phase energization. This more balanced force distribution on stator 20 reduces distortion by reducing the ovalization created by the application of two diametrically opposed forces as in the prior application.

The present invention thus provides a two-phase switched reluctance motor wherein the magnetic forces exerted on stator 20 are more balanced during each phase energization, thereby reducing the distortion and vibration created during each phase energization, and producing a quieter motor.

Figures 11, 12:
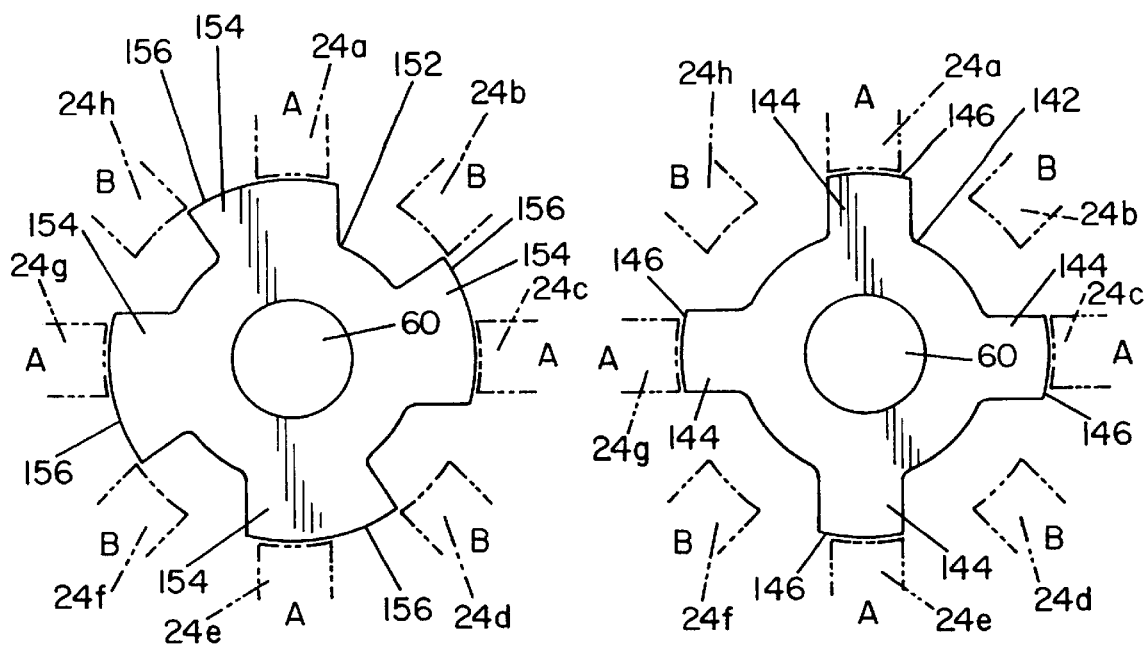
FIG. 11 is a sectional view taken along lines 11—11 of FIG. 10.
FIG. 12 is a sectional view taken along lines 12—12 of FIG. 10.

Referring now to FIGS. 10–12, a rotor 140 illustrating an alternate embodiment of the present invention is shown. Like rotor 40 previously described, rotor 140 is comprised of a stack of plate laminations. Rotor 140 is also comprised of a plurality of groups of laminations, designated 140a, 140b, 140c, 140d, 140e and 140f in the drawings. Unlike rotor 40, rotor groups 140a, 140c and 140e are comprised of a first rotor lamination 152, and rotor groups 140b, 140d and 140f are comprised of stacks of a second rotor lamination 142. Rotor lamination 152, best seen in FIG. 11, includes four equally spaced wide rotor poles 154 having a shape and configuration as heretofore described with respect to FIGS. 1–9. Wide rotor poles 154 have a wide rotor pole face 156. Rotor laminations 142, best seen in FIG. 12 include four equally spaced narrow rotor poles 144 having narrow rotor pole faces 146. Narrow rotor poles 144 have a shape and configuration as heretofore described with respect to FIGS. 1–9.

Rotor 140 is adapted for use with a stator 20 (as shown in FIG. 1) and is dimensioned for use within bore 12 defined by stator 20. The operation of rotor 140 is similar to that as heretofore described with respect to rotor 40. During each phase energization, such as for example phase B energization, the four wide rotor poles 154 on laminations 152 of groups 140a, 140c and 140e interact with the four energized stator poles 24b, 24d, 24f and 24h to cause rotation of rotor 140 through its first portion of rotation as wide rotor poles 154 move into positions of minimum reluctance with respect to energized stator poles 24b, 24d, 24f and 24h. The second portion of the angular rotation of rotor 140 is caused by narrow rotor poles 144 on rotor laminates 142 that form rotor groups 140b, 140d and 140f magnetically interact with the same energized stator poles 24b, 24d, 24f and 24h. As in the prior embodiment, during each phase energization, each energized stator pole interacts with a rotor pole throughout the phase energization, and like the prior embodiment, a four-direction force pattern is exerted on the stator. Thus, rotor 140 provides the same balanced forced distribution on stator 20 as does the embodiment shown in FIGS. 1–9.

Figure 13:
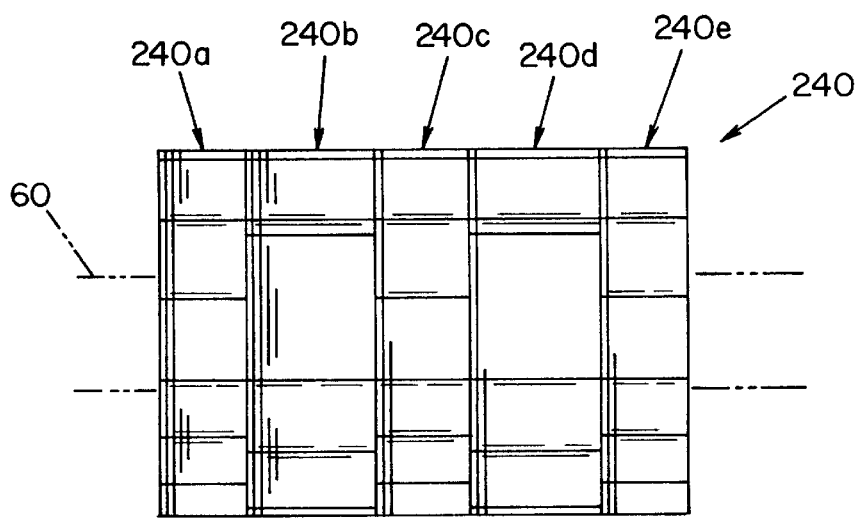
FIG. 13 is a side elevational view of a rotor illustrating an alternate embodiment of the present invention.

In the embodiments shown heretofore, i.e., in FIGS. 1–9 and in FIGS. 10–12, each respective rotor group of the two embodiments is shown having like numbers of rotor laminations. It will of course be appreciated that the number of rotor laminations within each group may vary. In this respect, FIG. 13 shows a side elevational view of a rotor 240 having five rotor groups, designated 240a, 240b, 240c, 240d and 240e. The laminations within rotor 240 may have a configuration such as rotor laminations 42 of the embodiment illustrated in FIGS. 1–9, or the rotor groups may be formed from two different types of rotor laminations, such as rotor laminations 142 and 152 of the embodiment shown in FIGS. 10–12. Irrespective of the type and configuration of the rotor laminations, FIG. 13 illustrates how rotor groups 240a, 240c and 240e may have like number of rotor laminations in each group; however, rotor groups 240b and 240d have a greater number of rotor laminations in each group. Though not required, preferably in the embodiment shown, the total number of rotor laminations in rotor groups 240a, 240c and 240e have the same total number of laminations as found in rotor groups 240b and 240d.

The foregoing description discloses preferred embodiments of the present invention. It should be appreciated that the embodiments are described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A switched reluctance motor, comprising:
    a stator having an even number of magnetically permeable stator poles evenly spaced circumferentially about a central axis, each of said stator poles facing said axis and traversing a first stator angle;
    a rotor mounted for rotation relative to said stator about said axis, said rotor comprised of at least two rotor sections, each of said two rotor sections having an even number of magnetically permeable rotor poles spaced about said axis, the number of rotor poles being ½ n, of said number each of said rotor sections including at least one narrow pole having a narrow face that traverses a first rotor angle, said first rotor angle being approximately equal to said first stator angle and at least one wide pole having a wide face that traverses a second rotor angle approximately twice said first rotor angle, said rotor poles being distributed on said rotor sections wherein a narrow pole follows a wide pole along a circumferential path in a direction of rotation of said rotor section, and said narrow pole face is spaced from said wide pole face on one side by a first angle equal to about twice said first stator angle and on another side by a second angle equal to about three times said first stator angle, said at least two rotor sections being angularly offset from each other about said axis by an angle of about four times said first stator angle.

2. A motor as defined in claim 1, wherein said stator has eight stator poles and each of said rotor sections has four rotor poles of which two are wide rotor poles and two are narrow rotor poles.

3. A motor as defined in claim 1, wherein said rotor poles on each of said rotor sections are distributed such that said narrow rotor pole is disposed to each side of said wide rotor pole.

4. A motor as defined in claim 1, wherein each of said rotor sections is comprised of a plurality of like rotor laminations.

5. A switched reluctance motor driven by a two-phase source, comprising:
  a stator having a plurality of evenly spaced, angularly-oriented like poles distributed thereon, said stator poles defining a gap between adjacent of said stator poles;
  windings for two phases of the motor wound about stator poles that are circumferentially separated by a winding and an associated stator pole of a different phase; and
  a rotor mounted for rotation about an axis relative to said stator, said rotor having at least two adjacent rotor sections of like cross-sections, each of said rotor sections having a wide rotor pole and a narrow rotor pole distributed on each of said rotor sections wherein a narrow rotor pole is disposed to each side of a wide rotor pole in a direction of circumferential rotation, said rotor sections being angularly offset relative to each other about said axis such that energization of one of said two phases causes said wide rotor pole on one of said at least two rotor sections to interact with a first energized stator pole while said wide rotor pole on another of said at least two rotor sections interacts with a second energized stator pole to induce a first torque on said rotor and to produce a first predetermined angular rotation of said rotor, and thereafter said narrow pole on said one of said at least two rotor sections interacts with said second stator pole while said narrow pole on said another of said at least two rotor sections interacts with said first stator pole to induce a second torque on said rotor and to produce a second predetermined angular rotation on said rotor.

6. A motor as defined in claim 5, wherein each of said rotor sections is comprised of a plurality of rotor laminations.

7. A motor as defined in claim 6, wherein the rotor laminations for each of said rotor sections are identical.

8. A motor as defined in claim 7, wherein each of said rotor sections includes a like number of rotor laminates.

9. A motor as defined in claim 5, wherein said at least two adjacent rotor sections have identical cross-sections.

10. A switched reluctance motor, comprising:
  a stator having eight evenly spaced, radially inwardly extending, like stator poles that define a uniform gap between adjacent stator poles, said stator formed from a plurality of laminations formed from a magnetically permeable material, said stator having a uniform cross-sectional shape along an axis extending through said stator;
  winding for two phases wound about stator poles that are circumferentially separated by a winding and an associated stator pole of a different one of said two phases;
  a rotor supported within said stator for a relative rotational movement about said axis, said rotor having at least two rotor sections, said two rotor sections having like cross-sectional shapes along said axis, each of said rotor sections having two, outwardly extending wide rotor poles disposed about 180° apart and two, outwardly extending narrow rotor poles disposed 180° apart, each of said narrow rotor poles being disposed between each of said wide rotor poles in a circumferential direction of rotation, the narrow poles and the wide poles on each of said rotor section being disposed relative to each other, wherein when said rotor is in a first angular rotor position, all of said wide rotor poles of said rotor sections are in said minimum reluctance positions with said energized stator poles, and when said rotor is in a second angular rotor position, all of said narrow rotor poles and all of said wide rotor poles are in minimum reluctance positions with energized stator poles, said first rotor section being angularly offset about said axis from said second rotor section by about 90°.

11. A motor as defined in claim 10, wherein each of said rotor sections is comprised of a plurality of rotor laminations.

12. A motor as defined in claim 11, wherein the rotor laminations for each of said rotor sections are identical.

13. A motor as defined in claim 12, wherein each of said rotor sections includes a like number of rotor laminations.

14. A motor as defined in claim 10, wherein at least two adjacent rotor sections have identical cross-sections.

15. A switched reluctance motor, comprising:
  a stator formed from a magnetically permeable material, having an n number of evenly spaced, radially oriented, like stator poles, said stator poles having like stator pole faces forming a uniform gap between adjacent of said stator poles;
  windings for two phases wound about stator poles that arc circumferentially separated by a winding and an associated stator pole of a different phase;
  a rotor mounted for rotation relative to said stator about an axis, said rotor having at least two rotor sections, a first of said at least two rotor sections including at least ¼ of said n number of like, wide rotor poles, each having a like, wide rotor pole face, and a second of said at least two rotor sections including at least ¼ of said n number of like, narrow rotor poles, each having a like, narrow rotor pole face, said rotor having:
    a first angular position wherein a first portion of said wide rotor pole faces of said first rotor section is in alignment with a first pair of opposite, energized stator poles and said narrow rotor pole faces of said second rotor section arc in alignment with gaps adjacent said first pair of energized stator poles, and
    a second angular position wherein a second portion of said wide rotor pole faces of said first rotor section is in alignment with said first pair of opposite energized stator poles and said narrow rotor pole faces of said second rotor section are in alignment with said first pair of energized stator poles.

16. A motor as defined in claim 15, wherein said first of at least two of said rotor sections includes ¼ n number of said like narrow rotor poles, each having a like narrow rotor pole face, and said second of said at least two rotor sections includes ¼ of n number of said like wide rotor poles, each having said wide rotor pole face.

17. A motor as defined in claim 16, wherein each of said at least two rotor sections has said wide rotor poles and said narrow rotor poles distributed thereon such that each of said narrow rotor poles is disposed between each of said wide rotor poles in a circumferential direction of rotation.

18. A motor as defined in claim 17, wherein:
in said first angular position, said first portion of said wide rotor pole faces of said second of at least two rotor sections are in alignment with a second pair of energized stator poles, and
in said second angular position, said second portion of said wide rotor pole faces of said second of said at least two rotor sections are in alignment with said second pair of energized stator poles and said narrow rotor pole faces of said first of at least two rotor sections are in alignment with said second pair of energized stator poles.

19. A motor as defined in claim 18, wherein said narrow rotor poles and said wide rotor poles of each of said at least two rotor sections are identical.

20. A motor as defined in claim 19, wherein said at least two rotor sections are formed of a plurality of like laminations.

21. A motor as defined in claim 20, wherein each of said at least two rotor sections includes the same number of laminations.

22. A motor as defined in claim 21, wherein said stator includes eight (8) stator poles and each of said at least two rotor sections includes a like number of laminations.

23. A motor as defined in claim 21, wherein said stator includes eight (8) stator poles and each of said at least two rotor sections includes a different number of laminations.

24. A motor as defined in claim 15, wherein said first of said at least two rotor sections includes ½ of said n number of like wide rotor poles and said second of said at least two rotor sections includes ½ of said n number of narrow rotor poles.

25. A motor as defined in claim 24, wherein in said first position said first portion of each of said wide rotor poles of said first of said at least two rotor sections is in alignment with an energized stator pole.

26. A motor as defined in claim 24, wherein in said second position said second portion of each of said wide rotor poles of said first of said at least two rotor sections is in alignment with said energized stator pole and each of said narrow rotor poles of said second of at least two rotor sections is in alignment with said energized stator pole.

27. A motor as defined in claim 24, wherein said at least two rotor sections are formed of a plurality of like laminations.

28. A motor as defined in claim 27, wherein each of said rotor sections includes a same number of said laminations.

29. A motor as defined in claim 27, wherein each of said rotor sections includes a different number of laminations.

30. A rotor for use in a switched reluctance motor, comprising:
a first rotor section having at least one radially outwardly extending narrow pole, said narrow pole having a pole face of a predetermined angle defining a first narrow pole face edge and a second narrow pole face edge in a direction of rotation of the rotor; and
a second rotor section having at least one radially outwardly extending wide rotor pole, said wide rotor pole having a wide pole face of an angle about twice the angle defining said narrow pole face, said wide pole face defining a first wide pole face edge and a second wide pole face edge in said direction of rotation of the rotor, said second rotor section being disposed adjacent said first rotor section wherein said second wide pole face edge is aligned with said second narrow pole face edge.

31. A rotor as defined in claim 30,
said first rotor section further comprising at least one radially outwardly extending wide pole having a wide rotor pole face of an angle equal to about twice the angle defining said narrow pole face, said at least one wide pole face of said first rotor section having a first wide pole face edge and a second wide pole face edge; and
said second rotor section further comprising at least one radially outwardly extending narrow pole having a narrow pole face equal to said narrow pole face of said first rotor section and having a first narrow pole face edge and a second narrow pole face edge, said narrow rotor pole of said second rotor section being disposed relative to said wide rotor pole of said first rotor section wherein said second narrow pole face edge on said second rotor section is aligned with second wide pole face edge on said first rotor section.

32. A rotor as defined in claim 31, wherein said first and second rotor sections have like cross-sectional shapes, and said first rotor section is angularly offset from said second rotor section about an axis through said rotor so that said second narrow pole face edges on said narrow poles are aligned with said second wide pole face edges of said wide poles.

33. A rotor as defined in claim 32, wherein said first and second rotor sections are comprised of a plurality of like laminations.

34. A rotor as defined in claim 33, wherein said first and second rotor sections include like numbers of laminations.

35. A rotor as defined in claim 30, wherein said first rotor section includes a plurality of equispaced, like narrow poles thereon, and said second rotor section includes a plurality of equispaced, like wide poles thereon, said second wide pole face edges being aligned with said second narrow pole face edges.

36. A rotor as defined in claim 35, wherein the number of narrow poles on said first rotor section is equal to the number of wide poles on said second rotor section.

37. A rotor as defined in claim 36, wherein said first and second rotor sections are comprised of laminations.

38. A rotor as defined in claim 37, wherein the thickness of said first rotor section is equal to the thickness of said second rotor section.

* * * * *